United States Patent
Day et al.

(10) Patent No.: US 12,208,775 B2
(45) Date of Patent: Jan. 28, 2025

(54) VEHICLES INCLUDING AN INTEGRATED LIFT BRACKET

(71) Applicant: Toyota Motor Engineering & Manufacturing North America, Inc., Plano, TX (US)

(72) Inventors: Robert C. Day, Canton, MI (US); Joshua L. Walsh, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 18/216,163

(22) Filed: Jun. 29, 2023

(65) Prior Publication Data

US 2025/0001982 A1 Jan. 2, 2025

(51) Int. Cl.
*B60S 11/00* (2006.01)
*B62D 21/02* (2006.01)
*B62D 25/20* (2006.01)

(52) U.S. Cl.
CPC .............. *B60S 11/00* (2013.01); *B62D 21/02* (2013.01)

(58) Field of Classification Search
CPC ......... B66F 3/46; B60S 11/00; B62D 25/2081
See application file for complete search history.

(56) References Cited

U.S. PATENT DOCUMENTS

| | | | | |
|---|---|---|---|---|
| 2,073,012 A * | 3/1937 | Hunter | ............... | B60S 11/00 254/133 R |
| 2,556,006 A * | 6/1951 | Slack | ............... | B60S 11/00 254/133 R |
| 2,608,431 A * | 2/1952 | Quarnstrom | ............ | B60S 11/00 293/111.1 |
| 2,628,812 A * | 2/1953 | Palazzolo | ............... | B60S 11/00 254/133 R |
| 2,672,317 A | 3/1954 | Berenyi | | |
| 3,799,379 A | 3/1974 | Grether et al. | | |
| 4,431,212 A * | 2/1984 | Hirabayashi | ............ | B60S 11/00 280/480 |
| 5,009,444 A | 4/1991 | Williams, Jr. | | |
| 6,062,545 A * | 5/2000 | Peavler | ................ | B60D 1/66 254/DIG. 4 |
| 6,361,023 B1 * | 3/2002 | Peavler | ................ | B66F 13/00 254/420 |
| 6,659,428 B2 | 1/2003 | Kubota | | |
| 6,695,290 B1 * | 2/2004 | O'Connell | ............... | B66F 1/06 254/133 R |

(Continued)

FOREIGN PATENT DOCUMENTS

| | | | |
|---|---|---|---|
| DE | 840055 C | * | 5/1952 |
| DE | 3040990 A1 | * | 6/1982 |

(Continued)

OTHER PUBLICATIONS

How to Jack up a Vehicle Safely (https://do-it-up.com/vehicles/reference/how-to-jack-up-a-vehicle-safely), Jul. 26, 2021, pp. 1-13.

*Primary Examiner* — Barry Gooden, Jr.
(74) *Attorney, Agent, or Firm* — Dinsmore & Shohl LLP

(57) ABSTRACT

A vehicle lift assembly includes a vehicle frame, and a lift bracket mounted to the vehicle frame. The lift bracket includes an outboard facing surface defining a lift arm-receiving opening. The vehicle lift assembly further includes a stopper positioned inboard of the lift arm-receiving opening.

9 Claims, 11 Drawing Sheets

(56) References Cited

U.S. PATENT DOCUMENTS

| | | |
|---|---|---|
| 10,953,818 B2 | 3/2021 | Graham et al. |
| 11,904,818 B2 * | 2/2024 | Hillier ........................ B66F 1/02 |
| 2013/0099086 A1 * | 4/2013 | Jevne ........................ B66F 1/06 |
| | | 248/511 |
| 2016/0207748 A1 * | 7/2016 | Cho ........................ B60P 3/125 |
| 2017/0203737 A1 * | 7/2017 | Cho ........................... B60S 9/04 |
| 2019/0263364 A1 | 8/2019 | Yamamoto |
| 2020/0039449 A1 * | 2/2020 | Graham ............... B60R 19/023 |
| 2022/0063571 A1 * | 3/2022 | Hillier ..................... B60S 11/00 |

FOREIGN PATENT DOCUMENTS

| | | | | |
|---|---|---|---|---|
| DE | 2803504 C2 * | 8/1988 | | |
| DE | 102010025787 A1 * | 3/2011 | ............. | B60S 11/00 |
| DE | 102011114658 A1 * | 4/2012 | ............. | B60G 11/04 |
| DE | 102012208857 A1 * | 11/2013 | ............. | B60S 11/00 |
| EP | 2666703 A2 * | 11/2013 | ............. | B60S 11/00 |
| FR | 1060789 A * | 4/1954 | | |
| GB | 388419 A | 2/1933 | | |
| JP | 59002971 A * | 1/1984 | | |
| WO | WO-2022047064 A1 * | 3/2022 | ............. | B60S 11/00 |

\* cited by examiner

VEHICLES INCLUDING AN INTEGRATED LIFT BRACKET

TECHNICAL FIELD

The present specification generally relates to vehicles and, more specifically, vehicles including an integrated lift bracket.

BACKGROUND

A high lift jack can be used to lift a portion of a vehicle to accomplish various tasks such as changing a tire or otherwise accessing an undercarriage of a vehicle. However, use of a high lift jack may cause unwanted contact with the vehicle body or components thereof, which may result in unwanted scratching to vehicle A-surfaces. Moreover, it may be difficult to determine appropriate locations of a vehicle with which to engage a high lift jack.

Accordingly, a need exists for alternative vehicles having an integrated lift bracket that prevents unwanted contact to vehicle A-surfaces and/or provides particular locations with which to engage a high lift jack.

SUMMARY

In one embodiment, a vehicle lift assembly includes a vehicle frame, a lift bracket, and a stopper. The lift bracket is mounted to the vehicle frame and includes an outboard facing surface defining a lift arm-receiving opening. The stopper is positioned inboard of the lift arm-receiving opening.

In another embodiment, a vehicle includes a vehicle frame and a lift bracket mounted to the vehicle frame. The lift bracket includes an outboard facing surface and an extending portion that extends beneath the vehicle frame in a vehicle vertical direction. The extending portion defines a lift arm-receiving opening.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to vehicles having an integrated lift bracket that prevent unwanted contact to vehicle A-surfaces and/or provide particular locations with which to engage a high lift jack. As generally indicated in the figures, a vehicle according to the present disclosure generally includes a frame, a lift bracket mounted to frame, and, in some embodiments, a stopper. The lift bracket incudes an outboard facing surface which defines a lift arm-receiving opening. The stopper is positioned inboard of the lift arm-receiving opening and acts as a stop to limit insertion of a high lift jack. The limit may prevent unwanted contact between a vehicle A-surface and the high lift jack, thereby preventing unwanted scratching, for example. Further embodiments and features are described in more detail herein.

As used herein, the term "vehicle A-surface" refers to visible vehicle surfaces and particularly to painted body panels. Vehicle A-surfaces may include but are not limited the visible surfaces of vehicle panels, visible surface of vehicle bumpers or the like.

Figure 1A:
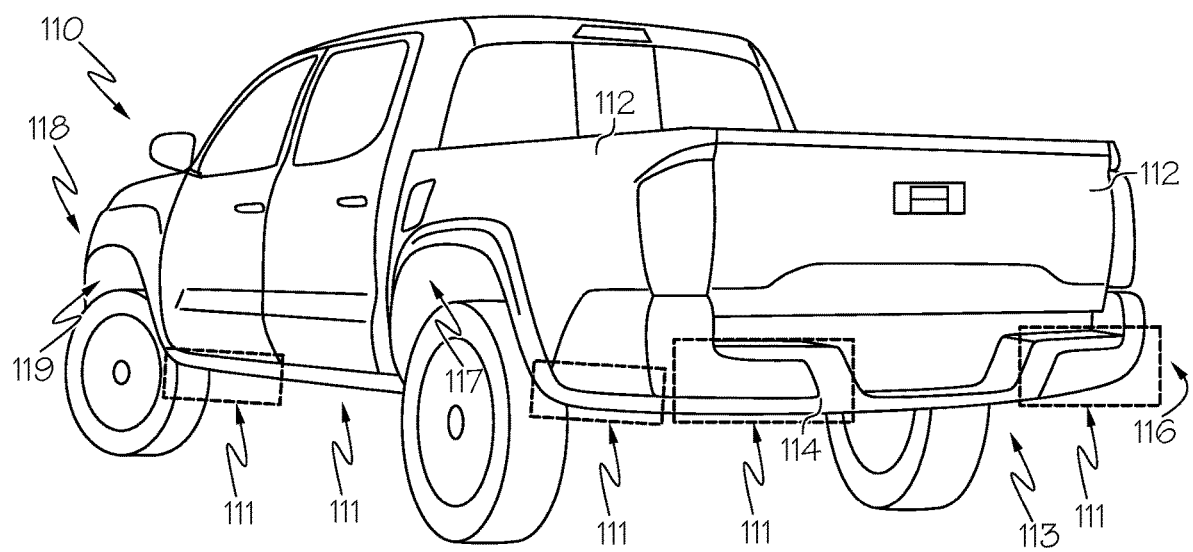
FIG. 1A depicts a vehicle including one or more locations for engaging a high lift jack, according to one or more embodiments shown and described herein.

Referring now to FIG. 1A, a vehicle 110 according to the various embodiments is illustrated. As used herein, the term "vehicle longitudinal direction" refers to the forward-rearward direction of the vehicle 110. The term "vehicle lateral direction" refers to the cross-vehicle direction, and is transverse to the vehicle longitudinal direction. The term "vehicle vertical direction" refers to the upward-downward direction of the vehicle. Also used herein are the direction terms "outboard" and "inboard." Outboard refers to positions away from a center of the vehicle 110 in the vehicle lateral or longitudinal direction and inboard refers to positions toward the center of the vehicle 110 in the vehicle lateral or longitudinal direction. It is noted that while the vehicle 110 is depicted as pick-up truck, the vehicle may be any passenger vehicle such as, for example, a terrestrial, aquatic, and/or airborne vehicle.

As depicted, the vehicle 110 may include a plurality of A-surfaces, such as a visible body panel surface(s) 112 and/or a visible bumper surface(s) 114 of the vehicle bumper 113. Schematically depicted is a plurality of locations 111, where a lift bracket for receiving a high lift jack may be mounted. It is noted that a lift bracket as will be described in greater detail below may be located at any of the indicated locations 111 or only some of the indicated locations 111. From the perspective of FIG. 1A, the lift bracket may be hidden from view by body panel surface(s) 112 or the bumper surface(s) 114 of the vehicle 110.

Figure 1B:
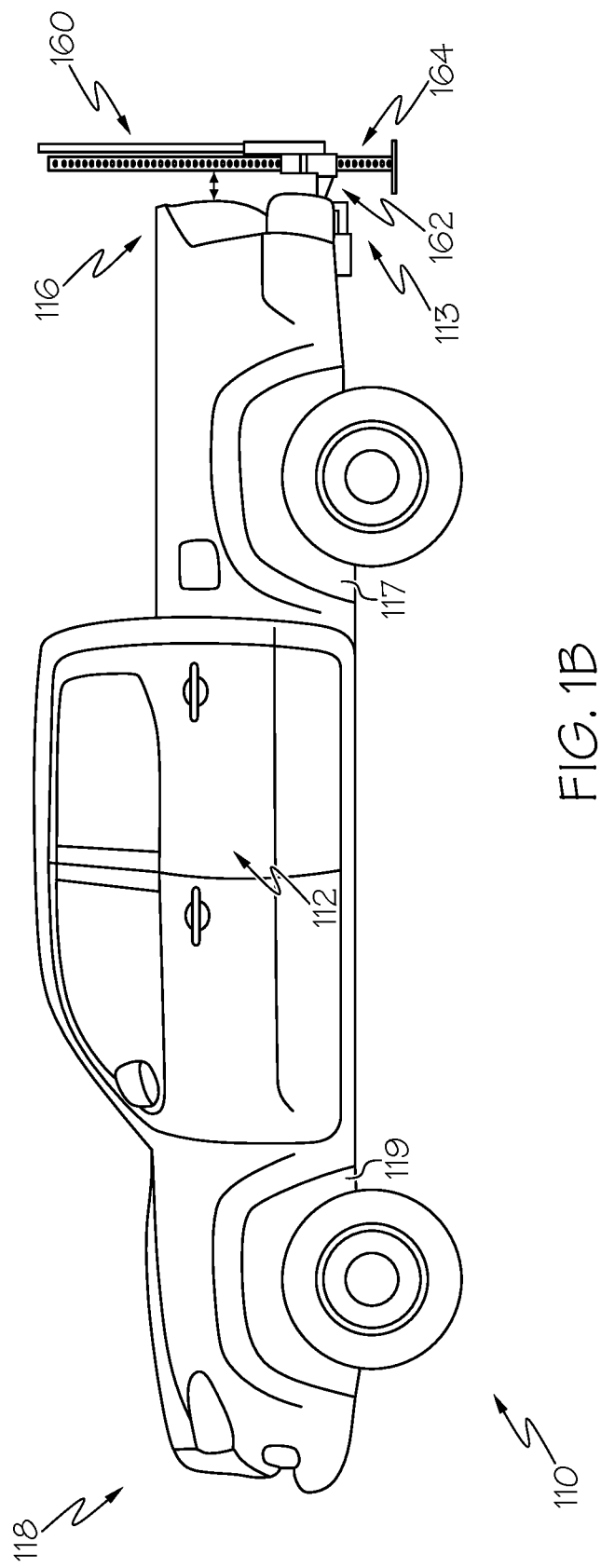
FIG. 1B depicts a side view of a vehicle engaged with a high lift, according to one or more embodiments shown and described herein.

Referring now to FIG. 1B, a side view of the vehicle 110 is depicted. In the depicted embodiment, the vehicle 110 is engaged with a high lift jack 160. In particular, the high lift jack 160 includes a lift arm 162 and a vertical support 164. The lift arm 162 may be actuated (such as via a crank, lever, etc.) up and down the vertical support 164 to lift the vehicle 110. As noted above, portions of the high lift jack 160, such as the vertical support 164 may inadvertently contact the vehicle 110, which may lead to scratching of the vehicle A-surface, for example. In embodiments as will be described in greater detail below, the lift bracket and/or additional stopper features may limit the distance the lift arm 162 may be inserted under the vehicle thereby maintaining a spacing between the vertical support 164, for example, and the vehicle A surface and preventing unwanted contact of the vehicle A-surfaces with the high lift jack 160.

Figure 2:
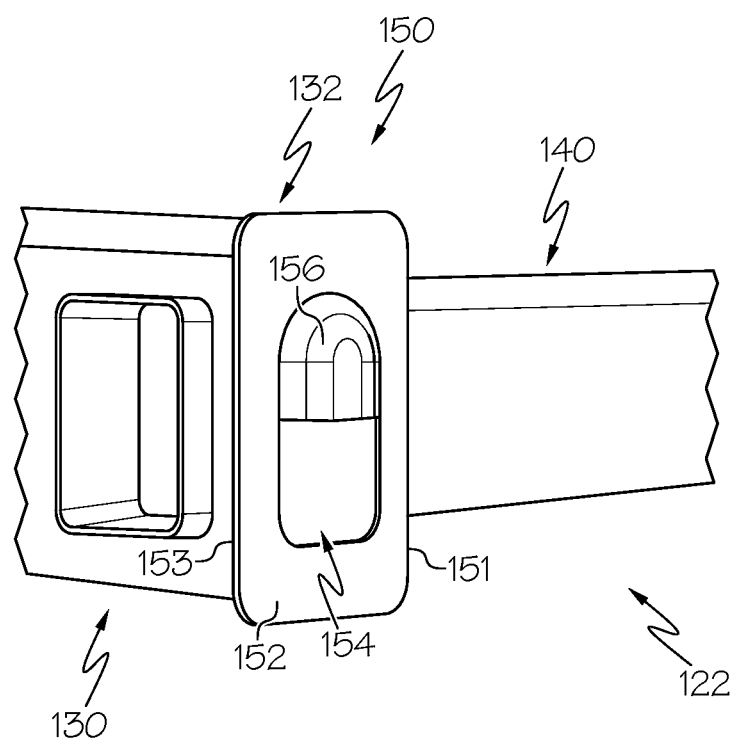
FIG. 2 depicts a frame of the vehicle of FIG. 1 illustrating a rear installation of a lift bracket, according to one or more embodiments shown and described herein.

Referring now to FIG. 2, a portion of a frame 122 of the vehicle is generally depicted. A vehicle frame 122 may be formed of a plurality of different extending members coupled together to form a chassis. In the embodiment depicted, the vehicle 110 includes a longitudinal side rail 130 and a lateral cross rail 140. As will be appreciated, the frame 122 may include two longitudinal side rails 130 extending in a vehicle longitudinal direction and a plurality of lateral cross rails connecting the two longitudinal side rails in a vehicle lateral direction. In embodiments, as depicted a lift bracket 150 may be mounted to the frame 122. For example, the lift bracket 150 may be mounted to the frame 122 adjacent to or at a junction between the longitudinal side rail 130 and the lateral cross rail 140, though other locations are contemplated and possible. In embodiments, a lift bracket 150 may be mounted at a location toward a rear end 116 (generally indicated in FIGS. 1A and 1B) of the vehicle 110, such as near a rear wheel well 117 (depicted in FIGS. 1A and 1B). In addition or alternatively, a lift bracket 150 may be mounted toward a front end 118 (generally indicated in FIGS. 1A and 1B) of the vehicle 110, such as near a front wheel well 119 (depicted in FIGS. 1A and 1B).

FIG. 2 illustrates a rear installation location of the lift bracket 150 to the frame 122. As depicted, the lift bracket 150 may be attached to the frame 122 at an end 132 of the longitudinal side rail 130. The lift bracket 150 includes an outboard-facing surface 152 defining a lift arm-receiving opening 154. For example, the lift bracket 150, may include a mounting substrate 151 including the outboard-facing surface 152, which may be opposite a mounting surface 153 of the mounting substrate 151. The lift arm-receiving opening 154 may be sized and shaped to receive the lift arm 162 of a high lift jack 160, such as depicted in FIG. 1. The lift arm-receiving opening 154 may be formed through the entire thickness of the mounting substrate 151 or only a portion thereof. In the depicted embodiment, the lift bracket 150 includes an upper protruding lip 156. In embodiments, such as depicted, the upper protruding lip 156 extends from the outboard-facing surface 152. In the depicted embodiment, the upper protruding lip 156 is dome shaped, though other shapes are contemplated and possible (e.g., rectangular, triangular, etc.) As depicted, the upper protruding lip 156 is positioned above the lift arm-receiving opening 154 in the vehicle vertical direction. The upper protruding lip 156 may provide a region of increased strength or rigidity for engaging the lift arm 162 of the high lift jack 160.

As noted above, the lift bracket 150 may be mounted at an end 132 of the longitudinal side rail 130. In embodiments, the mounting surface 153 of the mounting substrate 151 may be mounted to the end 132 of the longitudinal side rail 130. For example, the mounting surface 153 may be attached to the end 132 of the longitudinal side rail 130 via any suitable manufacturing technique (e.g., welding, bolting brazing, etc.). As depicted, the mounting substrate 151 may be sized larger than the end 132 of the longitudinal side rail 130, which may allow for weld lines, if used, to be hidden from view, thereby improving aesthetic appears of the lift bracket and frame 122.

The lift bracket 150 may be formed via any suitable manufacturing techniques (e.g., stamped, forged, etc.). The lift bracket 150 may be formed of any suitable material such a steel, iron, etc.

Figure 3:
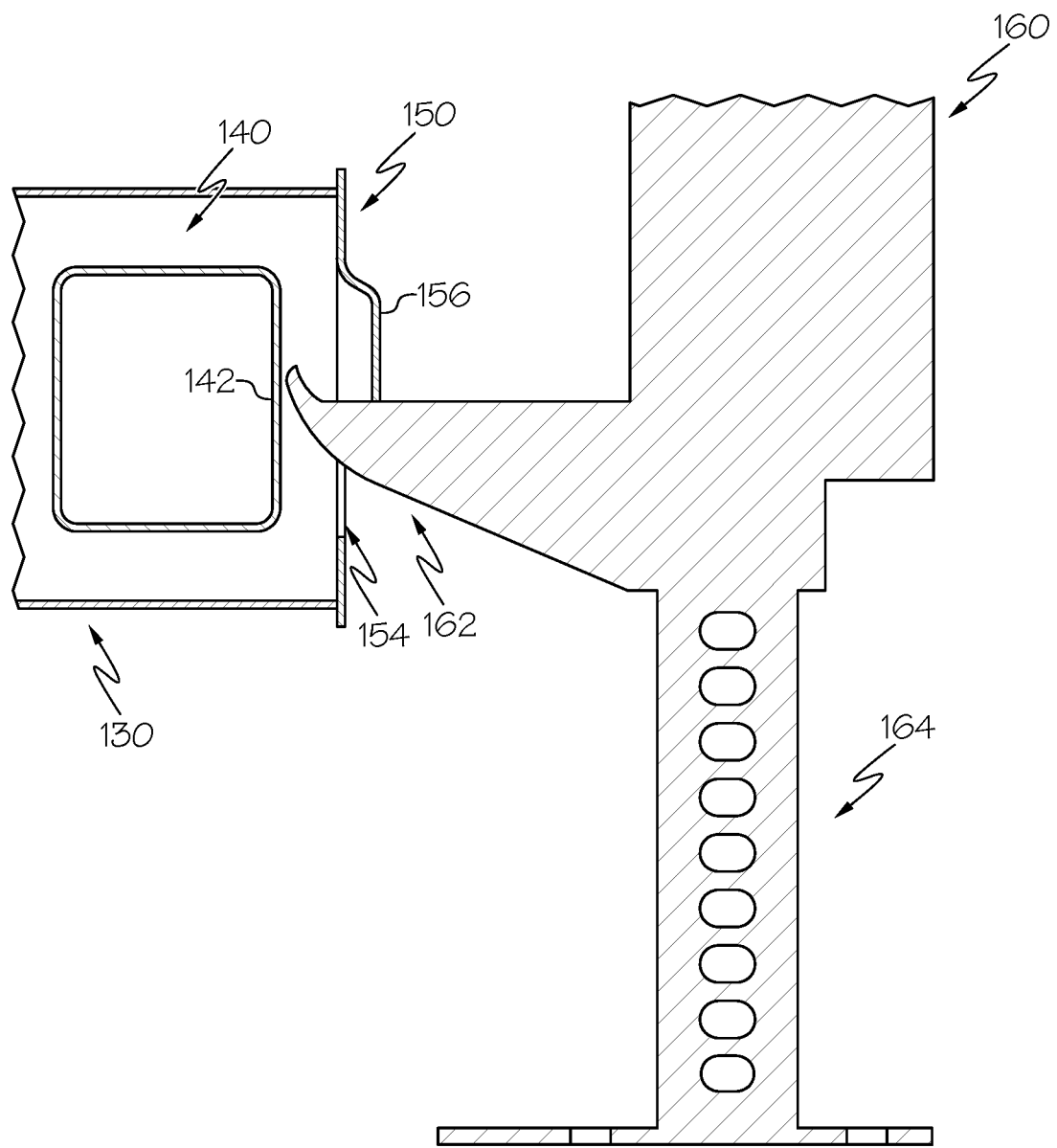
FIG. 3 depicts a schematic cross-section of the frame and lift bracket of FIG. 2 including a high lift jack engaged with the lift bracket, according to one or more embodiments shown and described herein.

Referring to FIGS. 2 and 3, in embodiments, the lateral cross rail 140 may intersect with the longitudinal side rail 130. For example, the lateral cross rail 140 may be received within and extend through the longitudinal side rail 130 as depicted. In embodiments, the lateral cross rail 140 may be positioned such that a surface 142 of the lateral cross rail 140 acts as a stopper to limit insertion distance of the lift arm 162 of the high lift jack 160.

FIG. 3 generally depicts a high lift jack 160, which may be configured to be ratcheted or otherwise actuated to vertically displace the lift arm 162 along the vertical support 164. As depicted, the lift arm 162 may be inserted into the lift arm-receiving opening 154 of the lift bracket 150. The upper protruding lip 156 may be engaged with the lift arm 162, such that force of lifting is concentrated on the upper protruding lip 156. As depicted, the lateral cross rail 140 may be positioned to stop insertion of the lift arm 162. In some embodiments, the lift arm-receiving opening 154 may be sized to limit and insertion depth of the lift arm 162 a predetermined distance. The distance of insertion may thereby be limited to prevent contact between the high lift jack 160 and the vehicle A-surfaces, such as described above. Once positioned within the lift arm-receiving opening of the lift bracket 150, the high lift jack 160 may be actuated to lift the vehicle 110 while preventing contact with vehicle A-surfaces, thereby preventing unwanted scratching, for example.

Figure 4:
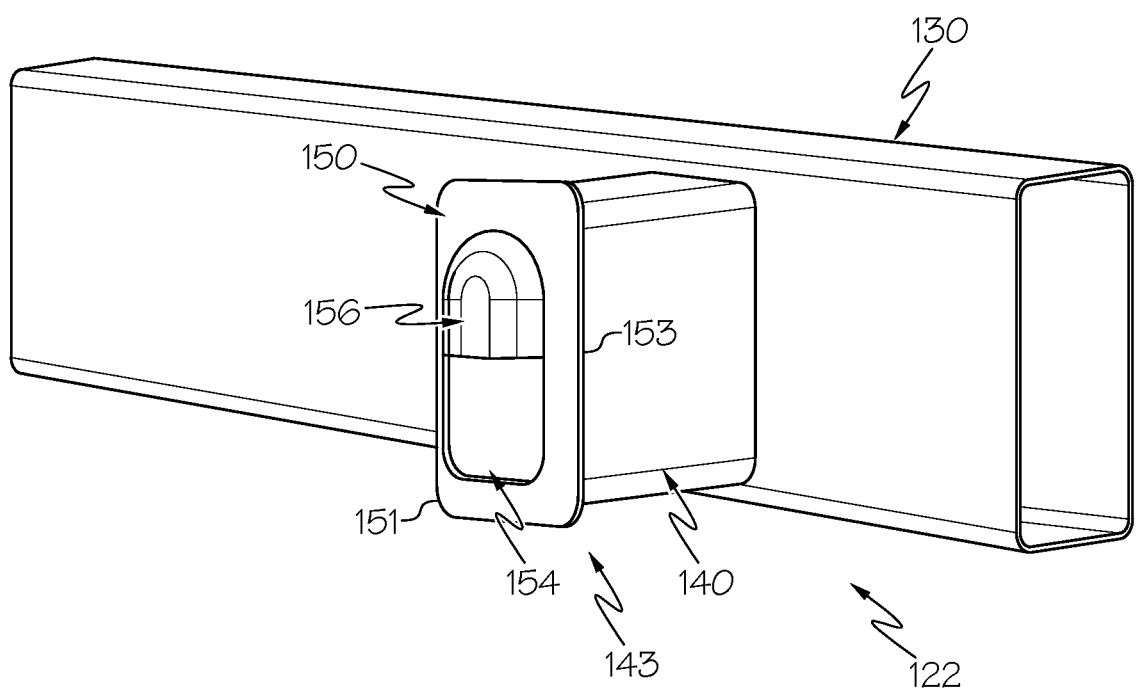
FIG. 4 depicts a frame of the vehicle of FIG. 1 illustrating a side installation of a lift bracket, according to one or more embodiments shown and described herein.

Referring now to FIG. 4, installation of the lift bracket 150 is illustrated as mounted in a vehicle side frame installation. In this embodiment, the lift bracket 150 is coupled to a rail end 143 of the lateral cross rail 140. Similar to the embodiment described above, the mounting surface 153 of the mounting substrate 151 may be mounted to the rail end 143 of the lateral cross rail 140. For example, the mounting surface 153 may be attached to the rail end 143 of the lateral cross rail 140 via any suitable manufacturing technique (e.g., welding, bolting brazing, etc.). The mounting substrate 151 may be sized larger than the rail end 143 of the lateral cross rail 140, which may allow for weld lines, if used, to be hidden from view, thereby improving aesthetic appears of the lift bracket and frame 122.

Figure 5:
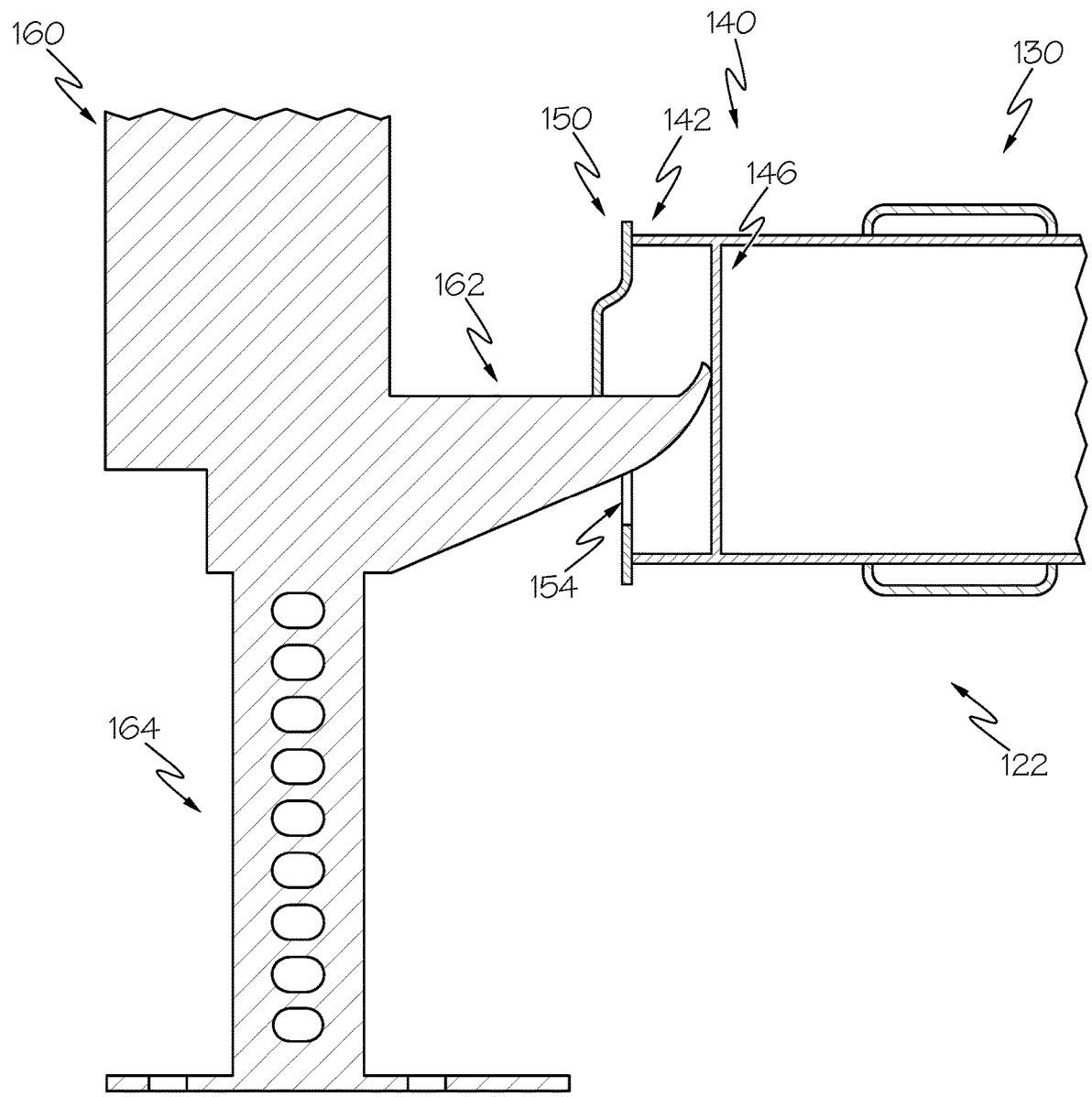
FIG. 5 depicts a schematic cross-section of the frame and lift bracket of FIG. 4 including a high lift jack engaged with the lift bracket, according to one or more embodiments shown and described herein.

Referring now to FIG. 5, a schematic cross-section of the frame 122 including the lateral cross rail 140 and the lift bracket 150 is generally depicted. As illustrated, when positioned within the lift arm-receiving opening 154, a portion of the lift arm 162 is positioned within the lateral cross rail 140. In embodiments, a stopper 146 may be positioned within the lateral cross rail 140 to limit an insertion depth of the lift arm 162 through the lift bracket 150. For example, the stopper 146 may be a plate or similar structure mounted within the lateral cross rail 140. For example, the plate may be any suitable material (e.g., steel, iron, etc.) and may be mounted within the lateral cross rail 140 via any suitable coupling technique (e.g., welding, bolts, etc.). The position of the stopper 146 may be adjusted based on a distance to an A-surface of the vehicle 110 to ensure that the high lift jack 160 remains spaced from any vehicle A-surfaces when the lift arm 162 is fully inserted into the lift bracket 150. Accordingly, the stopper 146 may be mounted at a position depending on the specific attributes of the vehicle 110. As noted above, in some embodiments, there may not be a separate stopper and instead stopper features may be integrated into the lift bracket 150 such as via the size of the lift arm-receiving opening 154.

Figure 6:
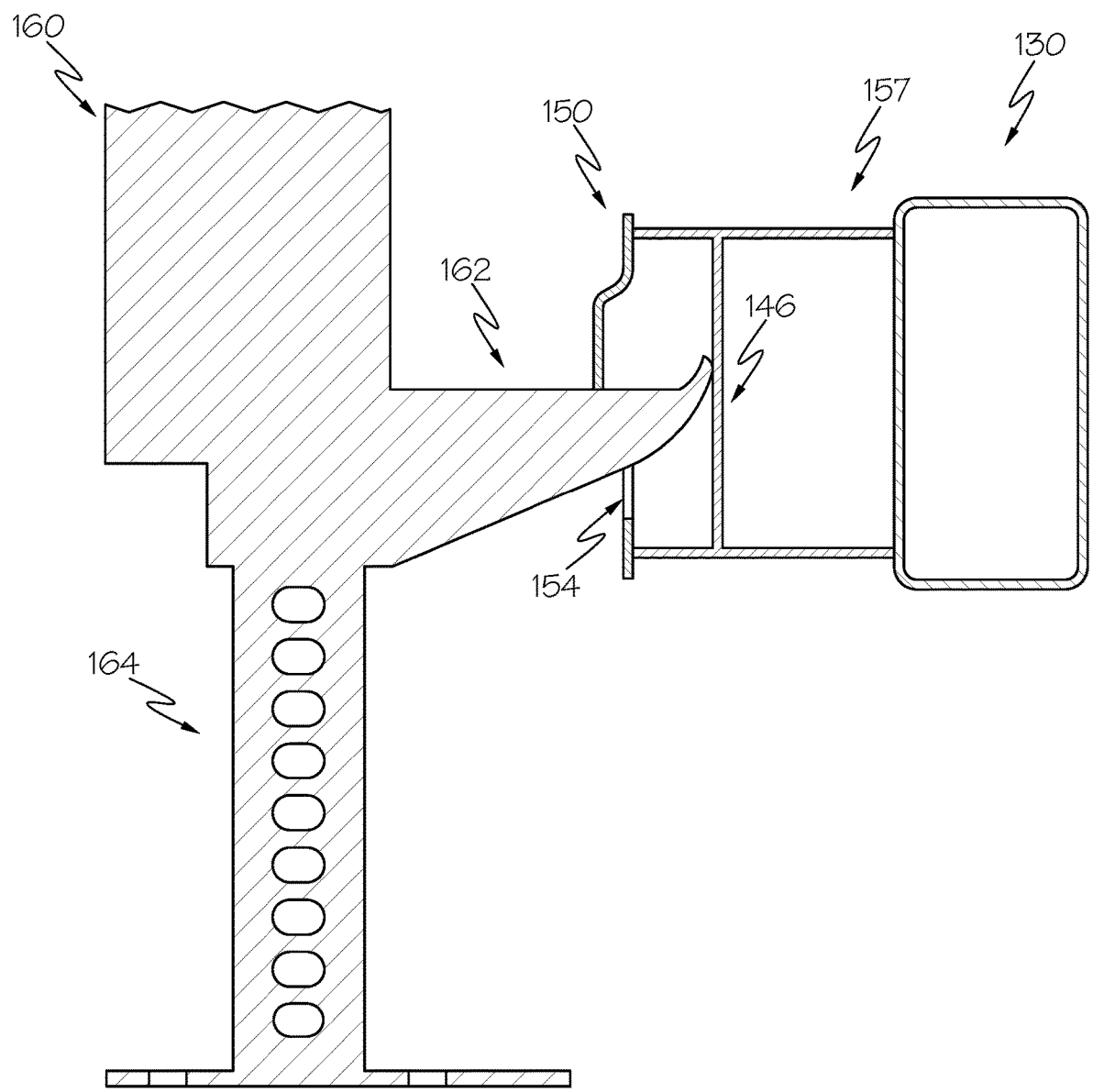
FIG. 6 depicts a frame of the vehicle of FIG. 1 illustrating another side installation of a lift bracket, according to one or more embodiments shown and described herein.

It should be understood that the lift bracket 150 may be mounted anywhere on the vehicle 110. In some embodiments, additional structure, such as a box or frame, may be added to the vehicle frame 122 to position the lift bracket 150 as desired. For example, with reference to FIG. 6, an alternative side installation of the lift bracket 150 is generally depicted. In particular, a spacer box 157 is illustrated as coupled to the vehicle frame 122 such as along the longitudinal side rail 130. The spacer box 157 may be formed of any suitable material (e.g., steel, iron, etc.) and may be coupled to the vehicle frame 122 via any suitable means (e.g., welding, brazing, bolts, etc.). In embodiments, lift bracket 150 may be coupled (e.g., via welding, brazing, bolts, etc.) to the spacer box 157 opposite the vehicle frame 122 (e.g., the longitudinal side rail 130). The spacer box 157 may space the lift bracket 150 closer to a side of the vehicle 110 to assist in limiting a travel distance of the lift arm 162 of the high lift jack 160 to engage the lift bracket 150. As in embodiments above, the lift bracket 150 may be dimensioned larger than the spacer box 157 so as to hide weld lines, for example.

Similar to embodiments above, the stopper 146 may instead be mounted within the spacer box 157 to provide a limit to insertion depth of the lift arm 162 of the high lift jack 160. As in the embodiment above, the position of the stopper 146 may be adjusted based on a distance to an A-surface of the vehicle 110 to ensure that the high lift jack 160 remains spaced from any vehicle A-surfaces when the lift arm 162 is fully inserted into the lift bracket 150. Accordingly, the spacer box 157 and the stopper 146 may be mounted at a position depending on the specific attributes of the vehicle 110. As noted above, in some embodiments, there may not be a separate stopper and instead stopper features may be integrated into the lift bracket 150 such as via the size of the lift arm-receiving opening 154.

Figure 7:
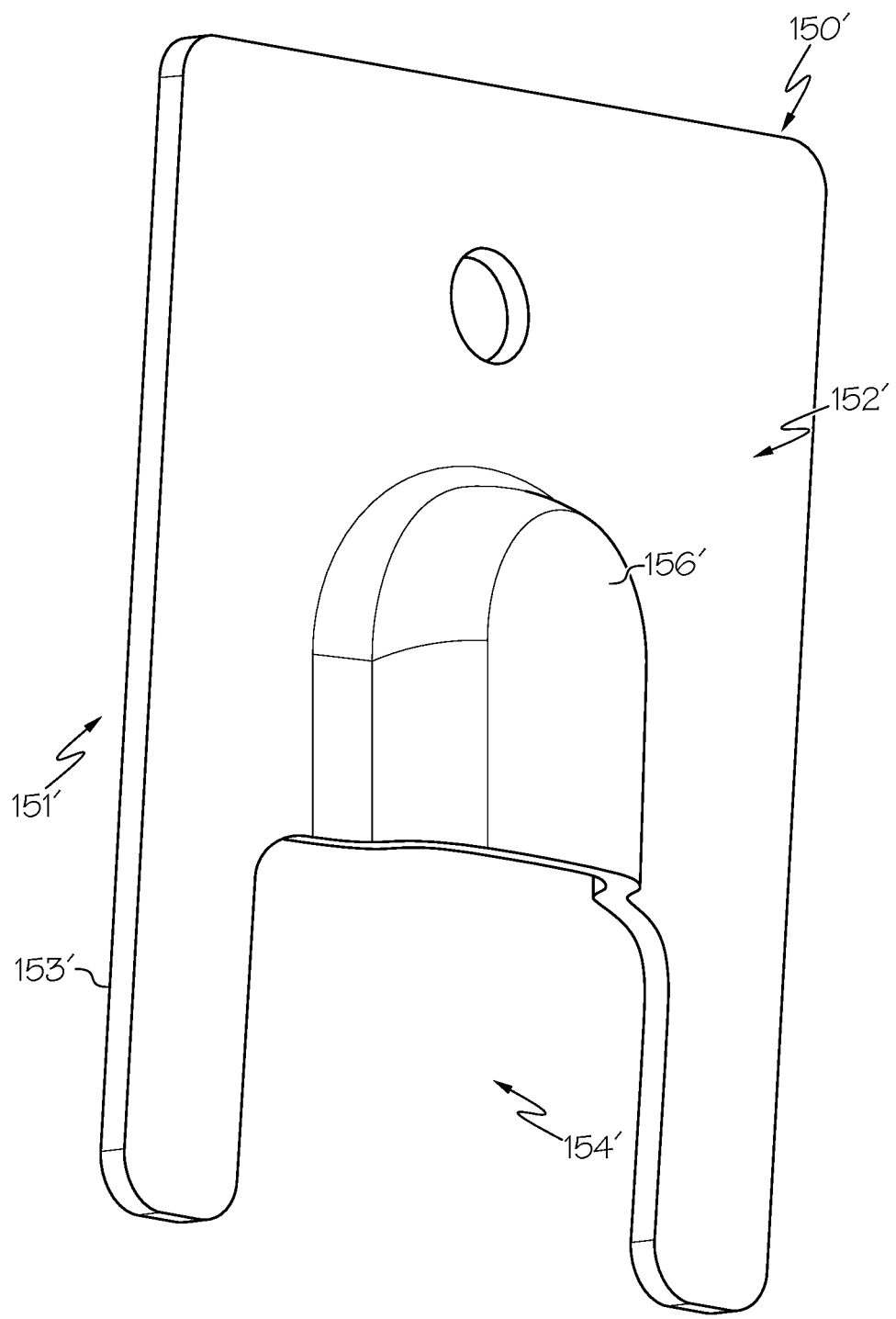
FIG. 7 depicts a perspective view of a lift bracket in isolation, according to one or more embodiments shown and described herein.

Referring now to FIG. 7, a lift bracket 150' similar to lift bracket 150 is depicted. Accordingly, the description provided with respect to the lift bracket 150 applies to the present embodiment unless otherwise noted or apparent. For example, the lift bracket 150' includes an outboard-facing surface 152' defining a lift arm-receiving opening 154'. For example, the lift bracket 150', may include a mounting substrate 151' including the outboard-facing surface 152', which may be opposite a mounting surface 153' of the mounting substrate 151'. However, in the present embodiment, instead of the lift arm-receiving opening 154' being surrounded by the mounting substrate 151', the lift arm-receiving opening is unbounded by the mounting substrate 151' in the vehicle vertical direction. That is, the lift arm-receiving opening 154' extends through a bottom of the mounting substrate 151'. This may allow for improved alignment and insertion of the lift arm 162 of the high lift jack 160.

Figure 8:
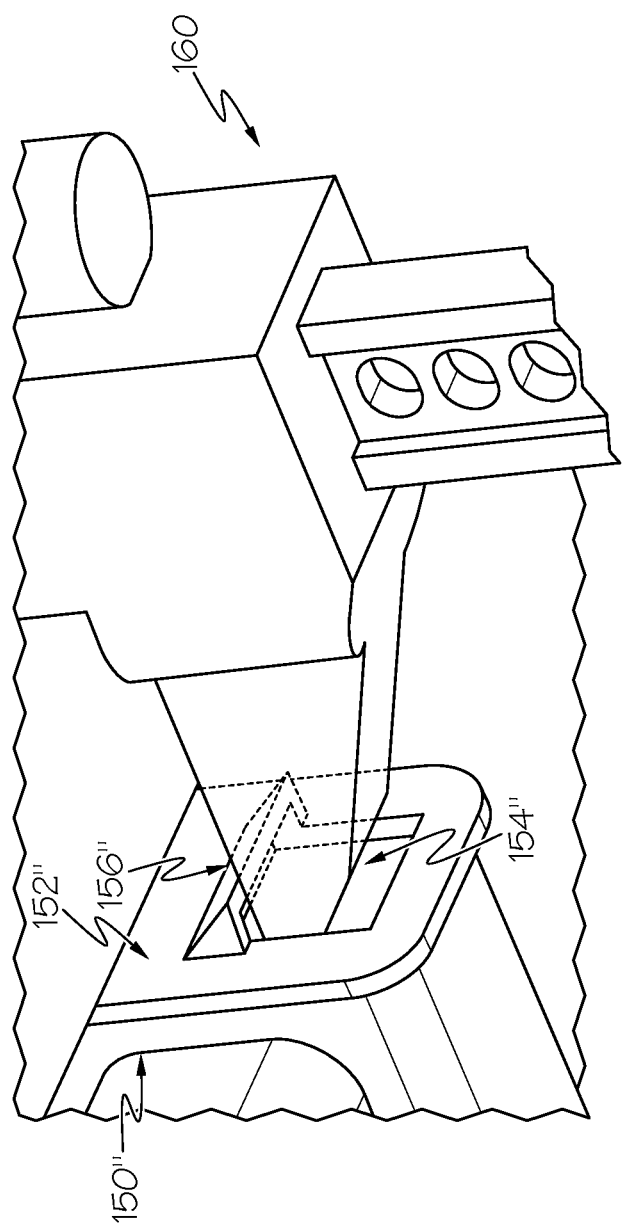
FIG. 8 depicts a perspective view of a lift bracket coupled to a vehicle frame, according to one or more embodiments shown and described herein.

FIG. 8 depicts a lift bracket 150" similar to lift bracket 150 or 150'. Accordingly, the description provided with respect to the lift brackets 150 and 150' applies to the present embodiment unless otherwise noted. For example, the lift bracket 150" includes an outboard-facing surface 152" defining a lift arm-receiving opening 154". For example, the lift bracket 150", may include a mounting substrate 151" including the outboard-facing surface 152", which may be opposite a mounting surface 153" of the mounting substrate 151". However, in the present embodiment, the upper protruding lip 156" is not dome-shaped but has a rectangular shape, which may provide for improved manufacturability, for example. It is noted that though not depicted, the lift arm-receiving opening 154" may be open through a bottom of the lift bracket 150" such as illustrated with respect to lift bracket 150".

Figure 9:
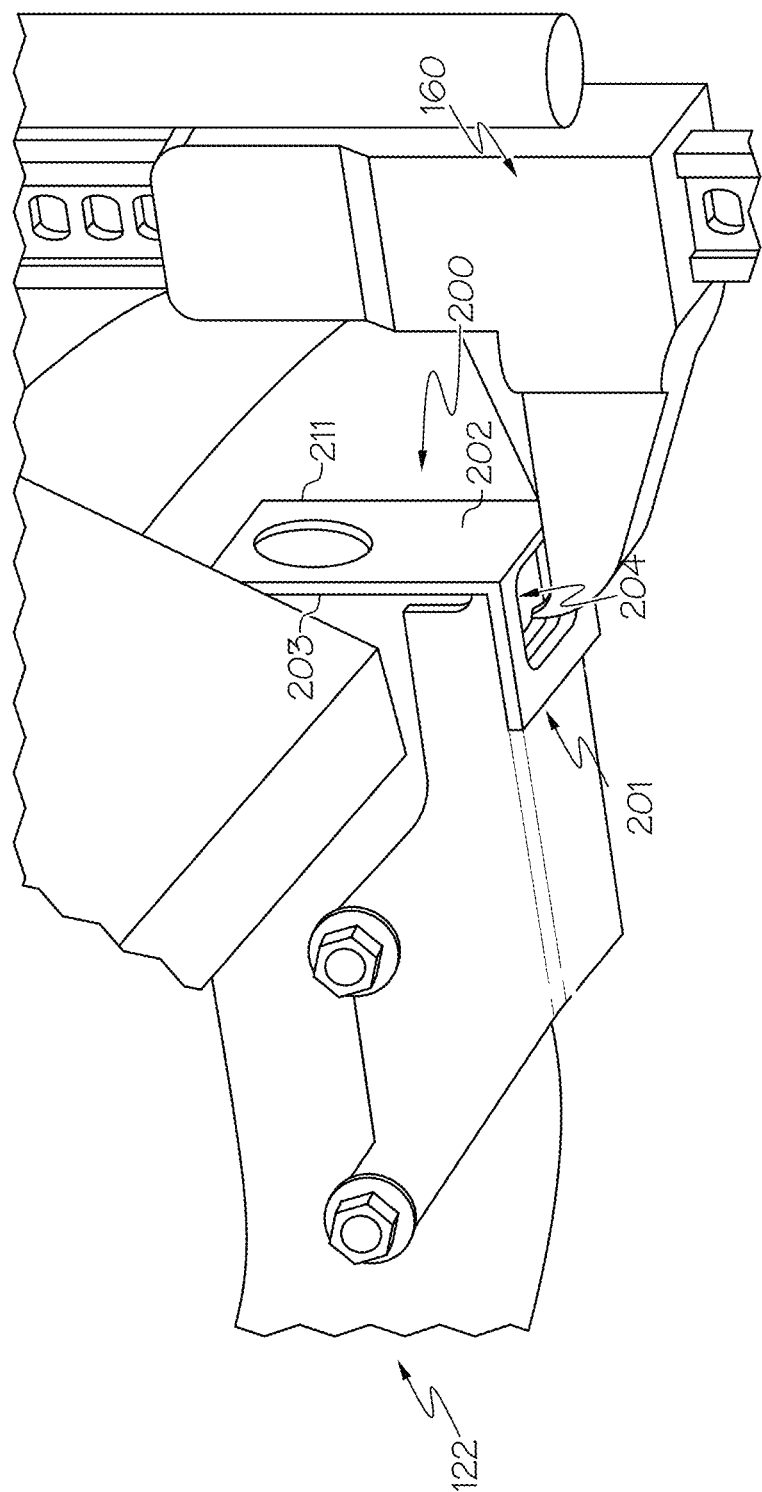
FIG. 9 depicts a perspective view of a lift bracket coupled to a vehicle frame, according to one or more embodiments shown and described herein.

Referring now to FIG. 9, a lift bracket 200 is generally depicted. In the depicted embodiment, the lift bracket 200 includes an outboard facing surface 202, which may form part of a mounting substrate 211. For example, the mounting substrate 211 may define a mounting surface 203 opposite the outboard facing surface 202, which may be coupled to the vehicle frame 122, for example, an end of a longitudinal side rail or a rail end of a lateral cross rail. In some embodiments, the lift bracket 200 may be mounted to the vehicle frame 122 at a junction formed between the lateral cross rail and a longitudinal side rail. Extending from the mounting substrate 211, may be an extending portion 201, which may extend under the frame 122 of the vehicle 110 in a vehicle vertical direction. The extending portion 201 may define a lift arm-receiving opening 204. The contours of the lift arm-receiving opening 204 may limit insertion distance and/or side to side movement. That is, the contours of the lift arm-receiving opening 204 may limit movement in a vehicle lateral direction or a vehicle longitudinal direction.

Figure 10:
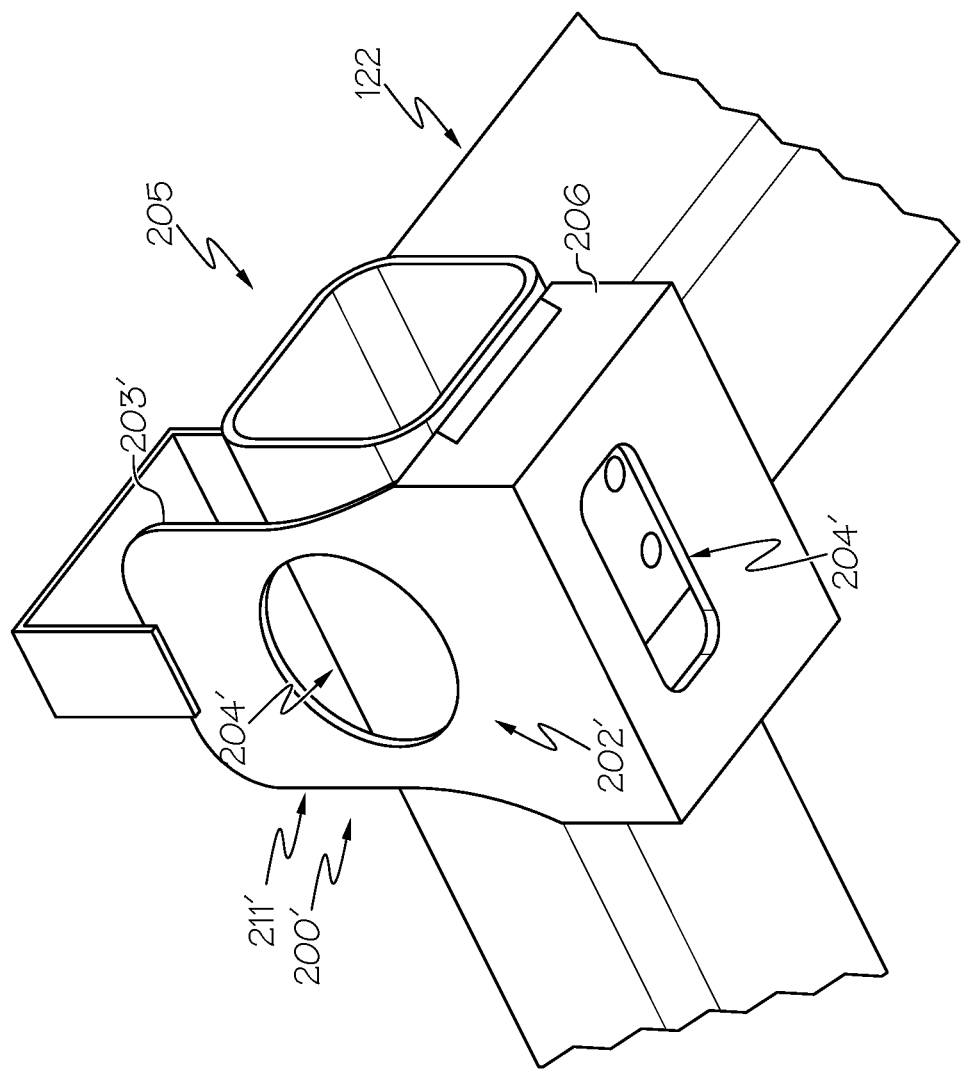
FIG. 10 depicts a perspective view of a lift bracket coupled to a vehicle frame, according to one or more embodiments shown and described herein.

Referring to FIG. 10, a lift bracket 200', similar to lift bracket 200 is depicted. In the depicted embodiment, the lift bracket 200' includes an outboard facing surface 202', which may form part of a mounting substrate 211'. For example, the mounting substrate 211 may define a mounting surface 203' opposite the outboard facing surface 202, which may be coupled to the vehicle frame 122, for example, an end of a longitudinal side rail or a rail end of a lateral cross rail. However, in some embodiments, the mounting substrate 211' may not be used for mounting. In some embodiments, the lift bracket 200' may be mounted to the vehicle frame 122 at a junction 205 formed between the lateral cross rail 140 and a longitudinal side rail 130. Similar to the above embodiments, extending from the mounting substrate 211', may be an extending portion 201', which may extend under the frame 122 of the vehicle 110 in a vehicle vertical direction. The extending portion 201' may define a lift arm-receiving opening 204'. Similarly, the contours of the lift arm-receiving opening 204' may limit insertion distance and/or side to side movement. That is, the contours of the lift arm-receiving opening 204' may limit movement in a vehicle lateral direction or a vehicle longitudinal direction. in some embodiments, the extending portion 201' may include one or more side walls 206, which may space the lift arm-receiving opening 204' from the frame 122 to prevent scraping of the lift arm 162 of the high lift jack 160 (such as previously depicted) against the frame 122. In some embodiments, the extending portion 401 may span the junction 205 between the lateral cross rail 140 and the longitudinal side rail 130 and avoid high stress areas of the vehicle 110. The lift bracket 200' may be coupled (e.g., welded, bolted, brazed, etc.) to the lateral cross rail 140 and/or the longitudinal side rail 130. As in embodiments above, the outboard facing surface 202' of the lift bracket 200' may also hide weld lines, where used. The various points of contact noted above may assist in spreading the load pressure caused by the high lift jack over a greater area.

It should now be understood that embodiments of the present disclosure are directed to vehicles that include a frame, a lift bracket, and, in some embodiments, a stopper or stopper feature. The lift bracket may include a lift arm-receiving opening for receiving a lift arm and a high lift jack. The stopper or stopper feature may act to limit insertion of the lift arm of the high lift jack to prevent contact between the high lift jack and vehicle A-surfaces.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a vehicle frame;
    a lift bracket mounted to the vehicle frame, the lift bracket comprising:
        an outboard facing surface defining a lift arm-receiving opening, wherein the outboard facing surface is directed away from a center of the vehicle in a vehicle lateral or longitudinal direction; and
        an upper protruding lip positioned above the lift arm-receiving opening in a vehicle vertical direction, wherein the upper protruding lip juts out from a plane of the outboard facing surface; and
    a stopper positioned inboard of the lift arm-receiving opening.

2. The vehicle of claim 1, wherein the vehicle frame includes a lateral cross rail and the lift bracket is coupled to a rail end of the lateral cross rail.

3. The vehicle of claim 1, wherein:
    the vehicle frame comprises a lateral cross rail and a longitudinal side rail, and
    the lift bracket is mounted adjacent a junction between the lateral cross rail and the longitudinal side rail.

4. The vehicle of claim 1, wherein the upper protruding lip is a dome shaped.

5. The vehicle of claim 1, wherein the lift bracket is coupled to an end of a longitudinal side rail.

6. The vehicle of claim 1, further comprising a spacer box coupling the lift bracket to the vehicle frame.

7. The vehicle of claim 6, wherein the stopper is positioned within the spacer box.

8. A vehicle comprising:
    a vehicle frame; and
    a lift bracket mounted to the vehicle frame, the lift bracket comprising an outboard facing surface and an extending portion that extends from the outboard facing surface beneath the vehicle frame in a vehicle inboard direction, the extending portion defining a lift arm-receiving opening;
    wherein the vehicle frame comprises a lateral cross rail and a longitudinal side rail that form a junction therebetween, and
    the extending portion of the lift bracket spans the junction between the lateral cross rail and the longitudinal side rail.

9. The vehicle of claim 8, wherein the lift arm-receiving opening is arranged to define a vertical insertion direction for insertion of a lift arm; and a contour of the lift arm-receiving opening limits an insertion distance of a lift arm of a high lift jack in a vehicle lateral direction or a vehicle longitudinal direction.

* * * * *

UNITED STATES PATENT AND TRADEMARK OFFICE
CERTIFICATE OF CORRECTION

PATENT NO. : 12,208,775 B2  
APPLICATION NO. : 18/216163  
DATED : January 28, 2025  
INVENTOR(S) : Robert C. Day and Joshua L. Walsh Page 1 of 1

It is certified that error appears in the above-identified patent and that said Letters Patent is hereby corrected as shown below:

On the Title Page

Column 2, item (56), U.S. patent documents, cite no. 3, delete "Berenyi" and insert --Barenyi--, therefor.

Signed and Sealed this  
Eighteenth Day of March, 2025

Coke Morgan Stewart  
*Acting Director of the United States Patent and Trademark Office*